United States Patent

Hoshino et al.

[11] Patent Number: 5,933,222
[45] Date of Patent: Aug. 3, 1999

[54] FILM SCANNER

[75] Inventors: Yasushi Hoshino; Kohichi Yamaguchi; Satoshi Harada; Toshiki Fujisawa; Kohsei Miyauchi, all of Hachioji; Haruyoshi Yamada, Suwa, all of Japan

[73] Assignees: Konica Corporation; Seiko Epson Corporation, both of Tokyo, Japan

[21] Appl. No.: 08/839,806

[22] Filed: Apr. 18, 1997

[30] Foreign Application Priority Data

Apr. 26, 1996 [JP] Japan ..................................... 8-107458

[51] Int. Cl.$^6$ ................................ H04N 1/04; H04N 1/46; G03B 27/62
[52] U.S. Cl. .......................... 355/75; 358/487; 358/496; 358/498; 348/96
[58] Field of Search ..................................... 358/474, 486, 358/487, 496, 498; 348/96, 97; 355/18, 75

[56] References Cited

U.S. PATENT DOCUMENTS

| | | |
|---|---|---|
| 4,858,003 | 8/1989 | Wirt et al. . |
| 5,212,512 | 5/1993 | Shiota . |
| 5,576,836 | 11/1996 | Sano et al. ................................ 358/302 |
| 5,754,314 | 5/1998 | Araki et al. ............................... 358/487 |
| 5,790,187 | 8/1998 | Suzuki ....................................... 348/96 |
| 5,808,757 | 9/1998 | Ikeda ........................................ 358/498 |

FOREIGN PATENT DOCUMENTS

| | | |
|---|---|---|
| 0 500 112 | 8/1992 | European Pat. Off. . |
| 97 10 6659 | 10/1998 | European Pat. Off. . |
| 7 125902 | 5/1995 | Japan . |

*Primary Examiner*—Alan A. Mathews
*Attorney, Agent, or Firm*—Finnegan, Henderson, Farabow, Garrett & Dunner, L.L.P.

[57] ABSTRACT

Provision is made of a carrier for holding a piece film cut every after several frames and a carrier for holding a long wound film contained in a cartridge and having a motor for frame-feeding. When the carrier is loaded, the carrier is driven at a high speed by a first stepping motor and is driven to a predetermined position, to optically detect whether the carrier is for holding the piece film or for holding the long wound film. When the carrier is for holding the piece film, the carrier is driven at a high speed by the first stepping motor and is prescanned. When the carrier is for holding the long wound film, the carrier is driven by a second stepping motor and is prescanned. In the main scanning, both of the carriers are driven by the second stepping motor at a low speed, so that image is read maintaining a high resolution.

9 Claims, 18 Drawing Sheets

DIAGRAM ILLUSTRATING THE STATE OF DISCRIMINATING THE CARRRIER A

DIAGRAM ILLUSTRATING THE STATE OF DISCRIMINATING THE CARRRIER A

DIAGRAM ILLUSTRATING THE STATE OF DISCRIMINATING THE CARRRIER A

DIAGRAM ILLUSTRATING THE STATE OF AUTOMATIC LOADING

DIAGRAM ILLUSTRATING THE STATE OF DISCRIMINATING THE CARRRIER B

DIAGRAM ILLUSTRATING THE STATE OF DISCRIMINATING THE CARRRIER B

FLOW CHART FOR AUTOMATIC LOADING AND CARRIER DISCRIMINATION

DIAGRAM ILLUSTRATING THE STATE OF PRESCANNING THE CARRRIER A

DIAGRAM ILLUSTRATING THE STATE OF PRESCANNING THE CARRRIER A

DIAGRAM ILLUSTRATING THE STATE OF
PRESCANNING THE CARRRIER A

DIAGRAM ILLUSTRATING THE STATE OF
PRESCANNING THE CARRRIER B
(MAIN SCANNING)

DIAGRAM ILLUSTRATING THE STATE OF
PRESCANNING THE CARRRIER B
(MAIN SCANNING)

DIAGRAM ILLUSTRATING THE STATE OF MAIN SCANNING THE CARRRIER A

DIAGRAM ILLUSTRATING THE STATE OF MAIN SCANNING THE CARRRIER A

FILM SCANNER

BACKGROUND OF THE INVENTION

1. Field of the Invention

The present invention relates to a film scanner. More specifically, the invention relates to a film scanner wherein a carrier holding the film is loaded into a device body, and image data recorded in the film held by the carrier loaded into the device body are read out by being photoelectrically converted.

2. Related Art of the Invention

In recent years, film scanners have been generally used according to which a silver salt film (negative film or positive film) that is developed is imaged by using solid imaging device such as CCD, and is output as digital data or TV signals.

Use of the film scanner of this type makes it possible to take image data recorded on the silver salt film into a computer as digital data, and to display them as TV signals on a household TV receiver.

In such a film scanner of a small size, a sleeve (hereinafter referred to as "piece film") cut into short strips every after several frames of a size of 35 mm (size J135) and a film (hereinafter referred to as "mount film") that is slidemounted for each frame, are held on a film-holding member called carrier, and are loaded.

In a film scanner of a large size, plural kinds of carriers are exchanged making it possible to read even films of a brownie size and large formats.

In the film scanner, it is preferable to change the reading characteristics and image output characteristics depending upon the kind of the film that is to be read. However, the conventional film scanners have not been equipped with means for recognizing the kind of the film or of the carrier. Therefore, it is not allowed to automatically change the characteristics; i.e., the characteristics must be changed by manual operation or by an instruction from an external computer.

In recent years, furthermore, there has been proposed a system according to which a film that is developed is preserved by a user in a state of being contained in a cartridge. The film (hereinafter referred to as "long wound film IX-240") used for this system is different from the traditional film of the size J135 in regard to vertical-to-lateral ratio and the whole size.

Besides, a film scanner for reading the image data of the "long wound film IX-240" is going to be proposed. According to the prior art, however, the cartridge is directly loaded into the film scanner arousing a problem in that it is not allowed to read the piece film and the mount film using the same scanner.

SUMMARY OF THE INVENTION

The present invention was accomplished in view of the above-mentioned problems, and its object is to provide a film scanner which is capable of meeting films and cartridges of various kinds, automatically recognizes the kind of the film or the cartridge at a moment when the carrier holding the film is mounted, and effects proper scanning depending upon the kind of the film and the kind of the cartridge in the prescanning operation or the main scanning operation.

Another object is to execute easy and reliable recognition at the time when the kind of the film or the kind of the cartridge is to be automatically recognized.

In order to accomplish the above-mentioned objects according to the film scanner of the present invention, a first carrier for holding the film is discriminated from a second carrier for holding a film cartridge which contains the film, and at the time of the prescanning operation, the first carrier is driven by a first drive means and the second carrier is driven by a second drive means.

According to this constitution, when a frame of the film is to be prescanned by driving the carrier, a drive means is selected depending upon the kind of the carrier, and the prescanning operation is efficiently carried out by using a proper drive means depending upon the kind of the carrier.

The prescanning operation is carried out prior to the main scanning operation which reads the final output image, in order to coarsely read the image data recorded in the film.

Here, in effecting the main scanning operation maintaining high precision after the prescanning operation, it is preferable that the first and second carriers are driven by the second drive means.

According to this constitution, the image data are efficiently read during the prescanning operation by selectively using the drive source, and the image data are precisely read maintaining a high resolution during the main scanning operation by using the same drive source.

Furthermore, the first carrier is discriminated over the second carrier based on the constitution of the carrier.

That is, the first carrier and the second carrier have differences in the constitution so that they can be discriminated from each other, and the differences are discriminated to discriminate the first carrier and the second carrier from each other.

Furthermore, the carriers can be discriminated by optically detecting predetermined positions of the first and second carriers.

According to this constitution, the kind of the carrier can be discriminated based, for example, upon the transmission and reflection of light falling on the carrier.

Here, image data reader means may be employed for the optical detection.

According to this constitution, the carrier is discriminated by using a source of light in the image data reader means and an imaging means, and there is no need to provide a source of light or an imaging means separate from that for reading the image for discriminating the carrier.

It is preferable that the carrier is discriminated after the first or the second carrier is moved to a predetermined position by the first drive means.

According to this constitution, the carrier is driven by using the same first drive means to efficiently discriminate the carrier.

Here, the first carrier may be the one for holding a piece film that is cut every after plural pieces, and the second carrier may be the one for holding a film cartridge which contains a long wound film.

According to this constitution, the carrier is discriminated to discriminate whether the film that is mounted is a piece film or a long wound film contained in the cartridge, and the prescanning operation is effected by using a drive means suited for the film.

It is further preferable to provide an opening which changes into a plurality of stages to accept the first and second carriers.

According to this constitution, the opening (carrier insertion port) changes to meet any carrier when the carrier is to be loaded. Therefore, plural kinds of carriers can be loaded and driven using the same internal drive mechanism. Besides, the opening that undergoes a change prevents the infiltration of foreign matters.

It is here preferable that the second drive means is capable of driving the first carrier or the second carrier maintaining a higher accuracy than that of the first drive means.

According to this constitution, the first and the second carriers can be read maintaining high precision during the main scanning operation by using the second drive means, and the first carrier can be efficiently read during the prescanning operation.

Other objects and features of the present invention will become obvious from the following description of the embodiments in conjunction with the accompanying drawings.

DESCRIPTION OF THE PREFERRED EMBODIMENTS

An embodiment of the present invention will now be described in detail with reference to the drawings.

Figure 1:
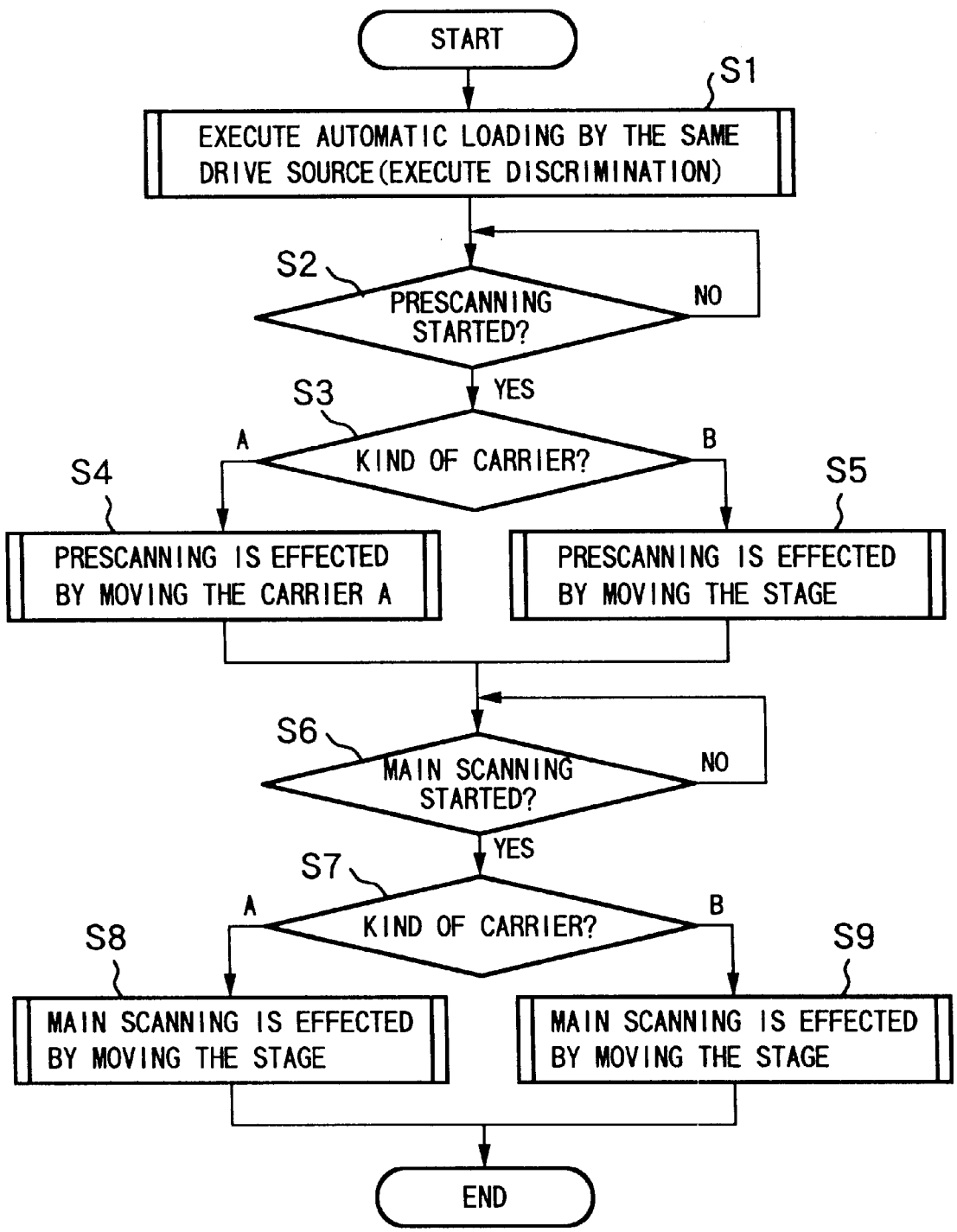
FIG. 1 is a flow chart schematically illustrating the contents of processing of a film scanner according to an embodiment of the present invention.
Figure 2:
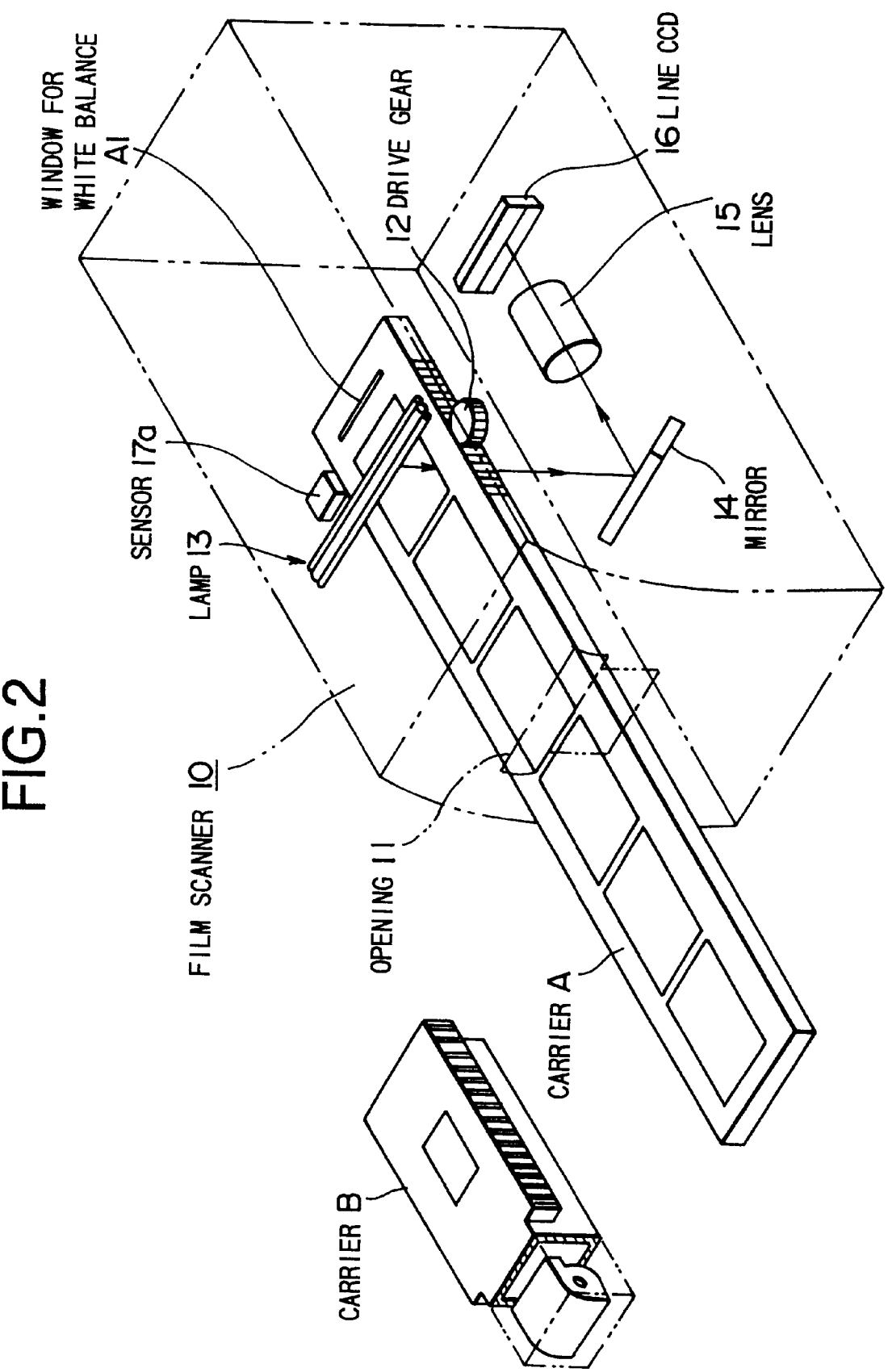
FIG. 2 is a perspective view illustrating the constitution of a film scanner according to the embodiment.
Figure 3A:
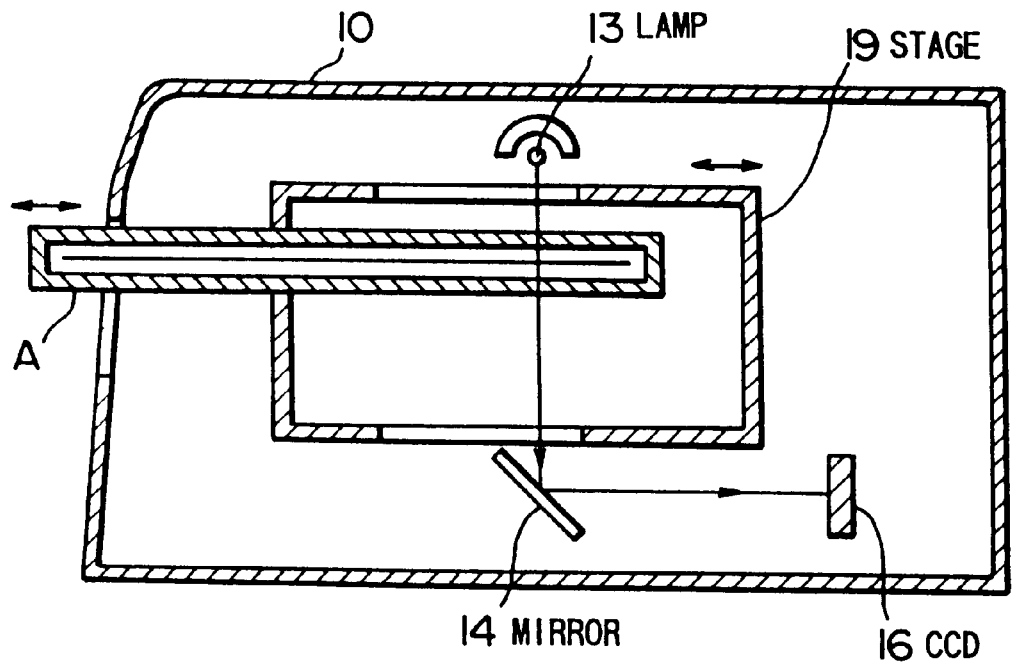
FIG. 3A and FIG. 3B are sectional views illustrating a relationship between a carrier and a stage.
Figure 3B:
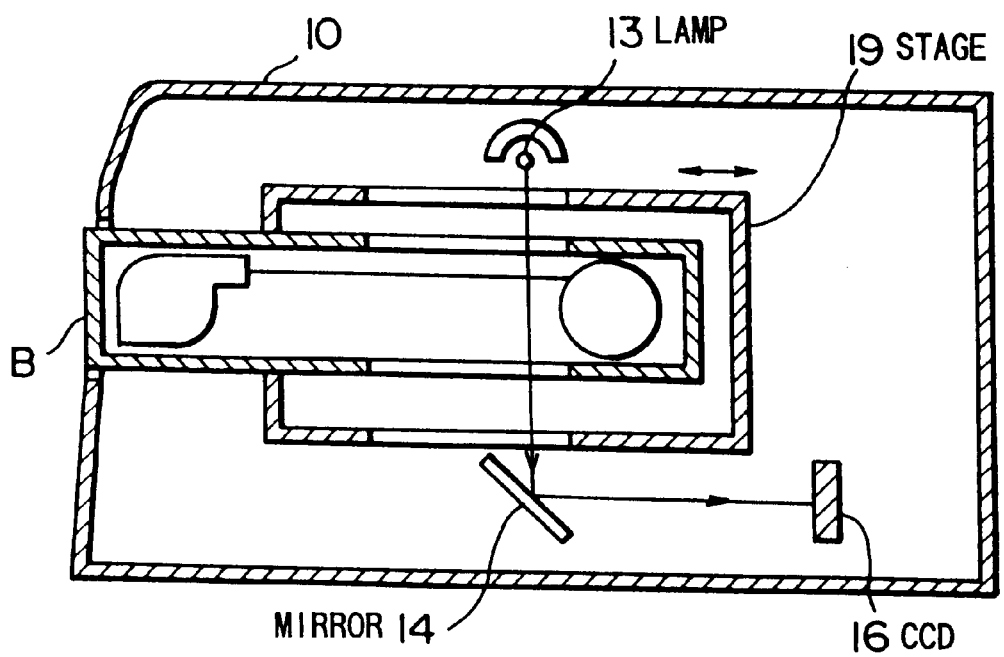
Figure 4:
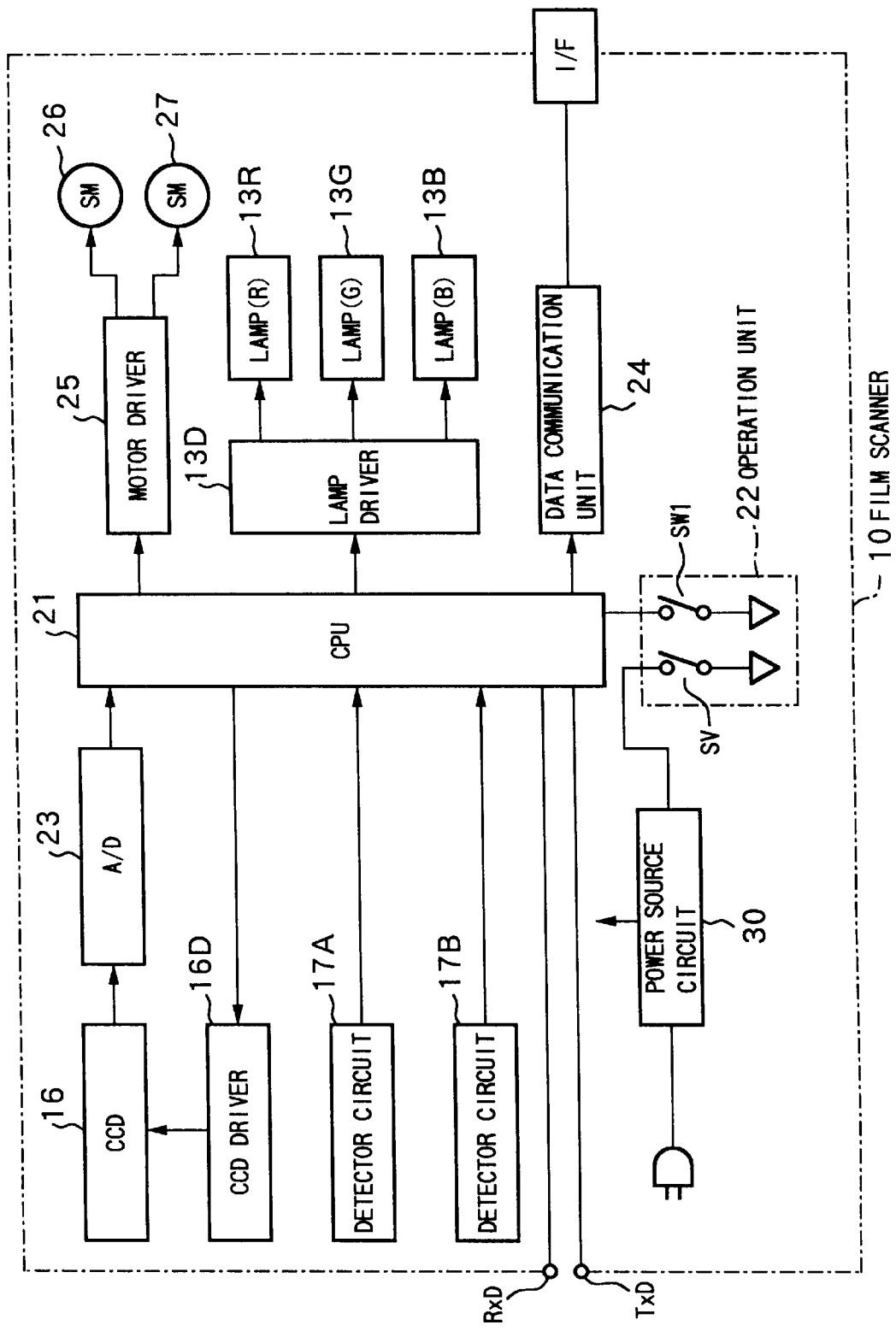
FIG. 4 is a diagram illustrating the electrical constitution of the film scanner according to the embodiment.

FIG. 1 is a flow chart illustrating the whole operation of a film scanner according to an embodiment, FIG. 2 is a perspective view illustrating the mechanical constitution of the film scanner according to the embodiment, FIGS. 3A and 3B are diagrams illustrating, in cross section, the constitution of major portions of the film scanner according to the embodiment, and FIG. 4 is a block diagram illustrating the electrical constitution of the film scanner according to the embodiment.

Here, the mechanical constitution and electrical constitution of the film scanner are described, first, and, then, the whole operation and characteristic operations of the film scanner will be described.

Constitution of the Film Scanner

First, described below with reference to the perspective view of FIG. 2 is the mechanical constitution of major constituent parts of the film scanner according to the embodiment of the invention.

FIG. 2 illustrates a film scanner 10, and carriers A and B used for the film scanner 10. Illustrated here is a state where the carrier A is being loaded into the film scanner 10 through an opening 11.

Here, the carrier A holds an ordinary piece film and has openings corresponding to the image data-recording surfaces of the frames of the film. The carrier A is provided, near an end portion thereof, with a window A1 for adjusting the white balance.

The carrier B holds a cartridge which contains a long wound film IX240. In this embodiment, the carrier B is not provided with the window for white balance.

The carrier A and the carrier B have different thicknesses, and the opening 11 has a window of two stages to meet thereto. The opening 11 is so constituted that the size of the window changes depending upon the carrier. This will be described later.

A drive gear 12 constitutes a pinion driven by a motor that is not shown, and is in mesh with a rack plate provided on the side surfaces of the carriers A and B.

As the drive gear rotates being driven by the motor, the carriers A and B are driven. Both the carrier A and the carrier B are allowed to smoothly move in the film scanner 10 along guide rails that are not shown.

A lamp 13 forms a source of light for reading image data, and is a halogen lamp or the like which emits linear light. The lamp 13 is constituted by a lamp 13R for red (R), a lamp 13G for green (G) and a lamp 13B for blue (B), and reads the data successively depending upon the three primary colors of light.

Light emitted from the lamp 13 passes through the film, reflected by a mirror 14, and forms an image on a line CCD 16 (hereinafter simply referred to as CCD 16) through a lens 15. An image data reader means is constituted by the lamp 13, mirror 14, lens 15 and CCD 16.

A sensor 17a constituted by a photoreflector or the like is a carrier position detector means for optically detecting the position of the carrier loaded into the film scanner 10, and is used for detecting the initial position of the carrier.

In the foregoing was briefly described the optical arrangement of the parts of the film scanner 10 and the carrier A with reference to the perspective view of FIG. 2. In practice, however, the film scanner 10 includes therein a stage 19 onto which the carrier will be loaded.

FIGS. 3A and 3B sectional views illustrating a relationship between the stage 19 and the carrier in the film scanner 10, wherein FIG. 3A is a sectional view illustrating a relationship between the stage 19 and the carrier A, and FIG. 3B is a sectional view illustrating a relationship between the stage 19 and the carrier B.

The carrier A and the carrier B only are quickly driven by the drive gear 12. Furthermore, the carrier A and the carrier B are driven together with the stage 19 maintaining precision due to a drive means that is not shown.

Next, described below with reference to FIG. 4 is the electrical constitution of the film scanner.

In the film scanner 10 shown in FIG. 4, a CPU 21 is a means for controlling the whole operation. That is, depending upon the result of detection by the sensor 17a which is the carrier position detector means, the carrier is driven to a predetermined position so that the window for white balance (detector hole) of the carrier is located at a position between the lamp 13 and the CCD 16. Depending upon the result of reading light from the lamp 13 that has passed through the window for white balance, the kind of the carrier is recognized, further., the kind of the film held by the carrier or the kind of the cartridge is recognized.

Communication terminals R×D, T×D are data communication terminals connected to the carrier B, and are connected to the CPU 21. The CPU 21 in the film scanner 10 makes communication with the carrier B through the communication terminals R×D and T×D.

A lamp driver 13D drives the lamps 13R to 13B for illuminating the film. The lamp driver 13D is connected to the CPU 21 and drives the lamps 13 provided for R, G and B.

The CCD 16 converts optical image signals that has passed through the film into electric image signals through the photoelectric conversion, and is driven by a CCD driver 16D. The CCD 16 is a line CCD formed by arranging the pixels on a line.

A first detector circuit 17A and a second detector circuit 17B are to detect the position of the carrier. When the carrier A (first carrier) or the carrier B (second carrier) is loaded into the film scanner 10, the detector circuits 17A and 17B work to set the initial position.

An A/D converter circuit 23 converts the image signals read by the CCD 16 into digital data.

A data communication unit 24 exchanges the data relative to a personal computer and may, for example, be an SCSI interface. The data communication unit 24 makes communication to external computers through an interface unit IF.

A first stepping motor (first drive means) 26 drives the carrier A and the carrier B at a high speed through the rack-and-pinion mechanism, and a second stepping motor (second drive means) 27 is capable of driving the stage 19 at a low speed. During the main scanning operation, the film is driven by the second stepping motor (second drive means) 27 to read the data maintaining a required high resolution. The stepping motors 26 and 27 are controlled by a motor driver 25.

A power source circuit 30 forms a power source for supplying electric power from an AC source to the circuit, and is provided with a switch SV for turning the power source circuit 30 on. Symbol SW1 denotes a reset switch for resetting the CPU 21. These switches SV and SW1 are provided on an operation unit 22.

The carrier B for containing the long wound film IX-240 is equipped with a mechanism for winding/rewinding the film in the cartridge, and a drive source (hereinafter referred to as frame feeding means) therefor.

Figure 5:
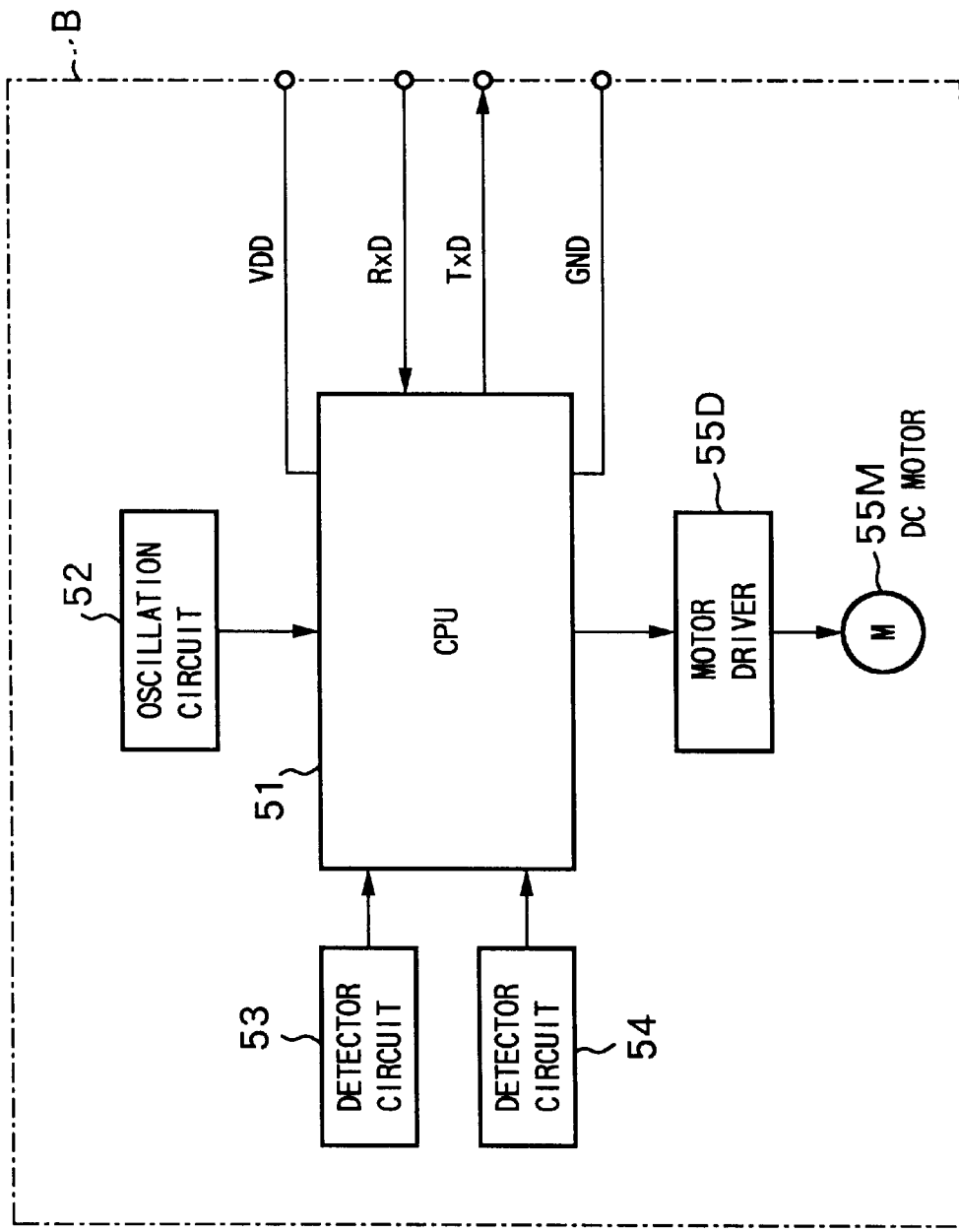
FIG. 5 is a diagram illustrating the circuit constitution of a carrier B.

The frame-feeding means includes a motor driver 55D controlled by a CPU 51 and a DC motor 55M as shown in FIG. 5.

The carrier B further includes therein the CPU 51 which stores a program for communication with the film scanner 10. The CPU 51 is operated by clocks generated by an oscillation circuit 52. There are further provided detector circuits 53 and 54 for detecting the state of feeding the long wound film IX-240 frame by frame and for detecting the end of the film.

Figure 6:
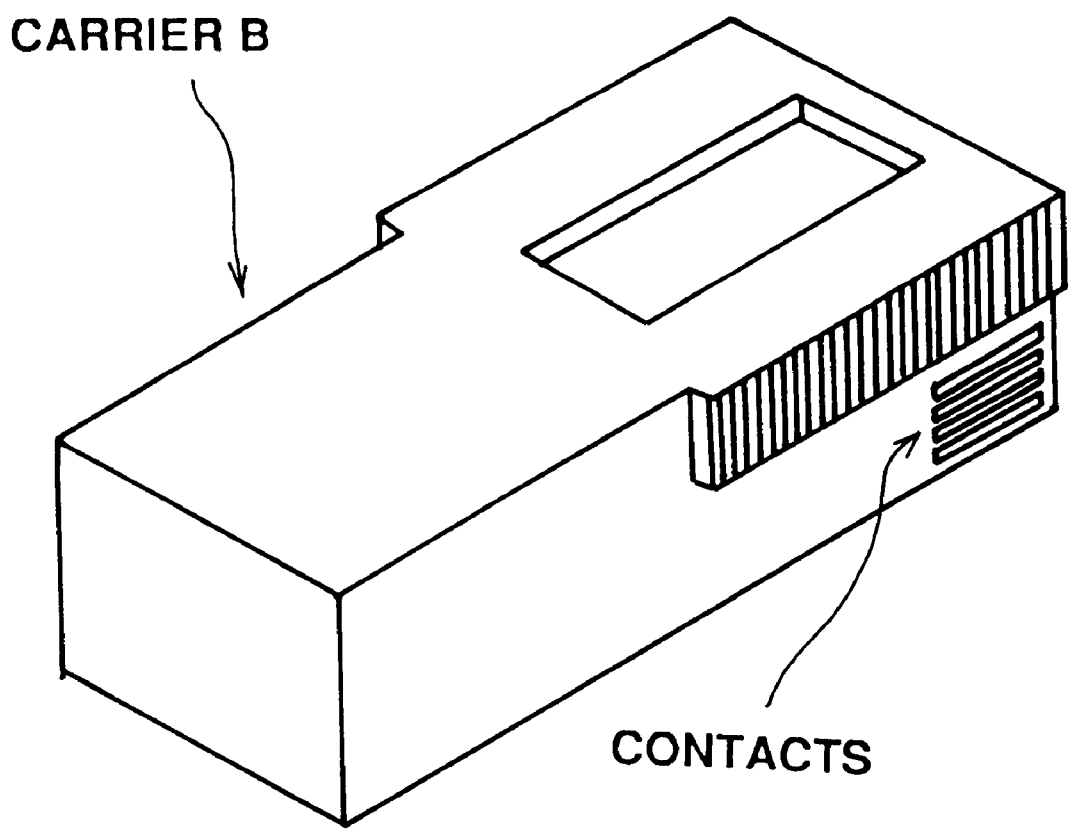
FIG. 6 is a perspective view of contacts of the carrier B.

As shown in FIG. 6, the carrier B has, on the side surface thereof, four contacts, i.e., communication terminals T×D/R×D, a power source VDD and a common potential GND. These contacts are rendered conductive to the contacts of the stage 19 side when the carrier B is loaded into the film scanner 10 and is set to the initial position.

That is, when the carrier B is inserted in the film scanner 10, the carrier B is driven by the stepping motor 26 so that the contacts provided on the side surface are brought to the position where they are rendered conductive to the contacts of the side of the stage 19. By maintaining this position, the electric power and instructions (frame-feeding instruction and the like) are fed from the film scanner 10.

Then, the CPU 51 sends a control signal to the motor driver 55D to turn the DC motor 55M. As a result, the film is delivered from the cartridge and extends toward the other end.

The winding spool is rotated by the DC motor 55M to wind the film. When the arrival of the first frame at the predetermined initial position is detected by the first detector circuit 52, the CPU 51 ends the operation for setting the initial position.

When the prescanning operation that will be described later starts, the data such as preset number of frames are received from the CPU 21 of the side of the film scanner through the communication terminals. The first detector circuit 52 detects the perforation of the film, and the CPU 51 controls the operation for feeding the film from the frame position to the next frame position by using the output of the detector circuit 52.

Operation of the Film Scanner

The operation of the film scanner will now be described with reference to the flow chart of FIG. 1. To simplify the description, mentioned below is a case where two kinds of carriers (carrier A and carrier B) are used.

Automatic Loading by the Same Drive Source, and Discrimination of the Carrier

When the power source switch provided on the operation unit of the film scanner is turned on, the CPU 21 resets the buffer and the like inside thereof to initialize them, and returns every part to the initial position.

Then, the carrier is driven by the same drive means to a predetermined position (S1 in FIG. 1). That is, the stepping motor 26 drives the carrier (which may be either the carrier A or the carrier B) via the drive gear 12 (automatic loading).

At this moment, the carrier has not been discriminated, and the film scanner 10 is quite unaware of the kind of the carrier. Therefore, this offers an advantage in that the carrier can be driven by the same drive means. In parallel with this drive, the kind of the carrier is discriminated.

The automatic loading and the discrimination of the carrier will now be described with reference to FIG. 7.

Figure 7:
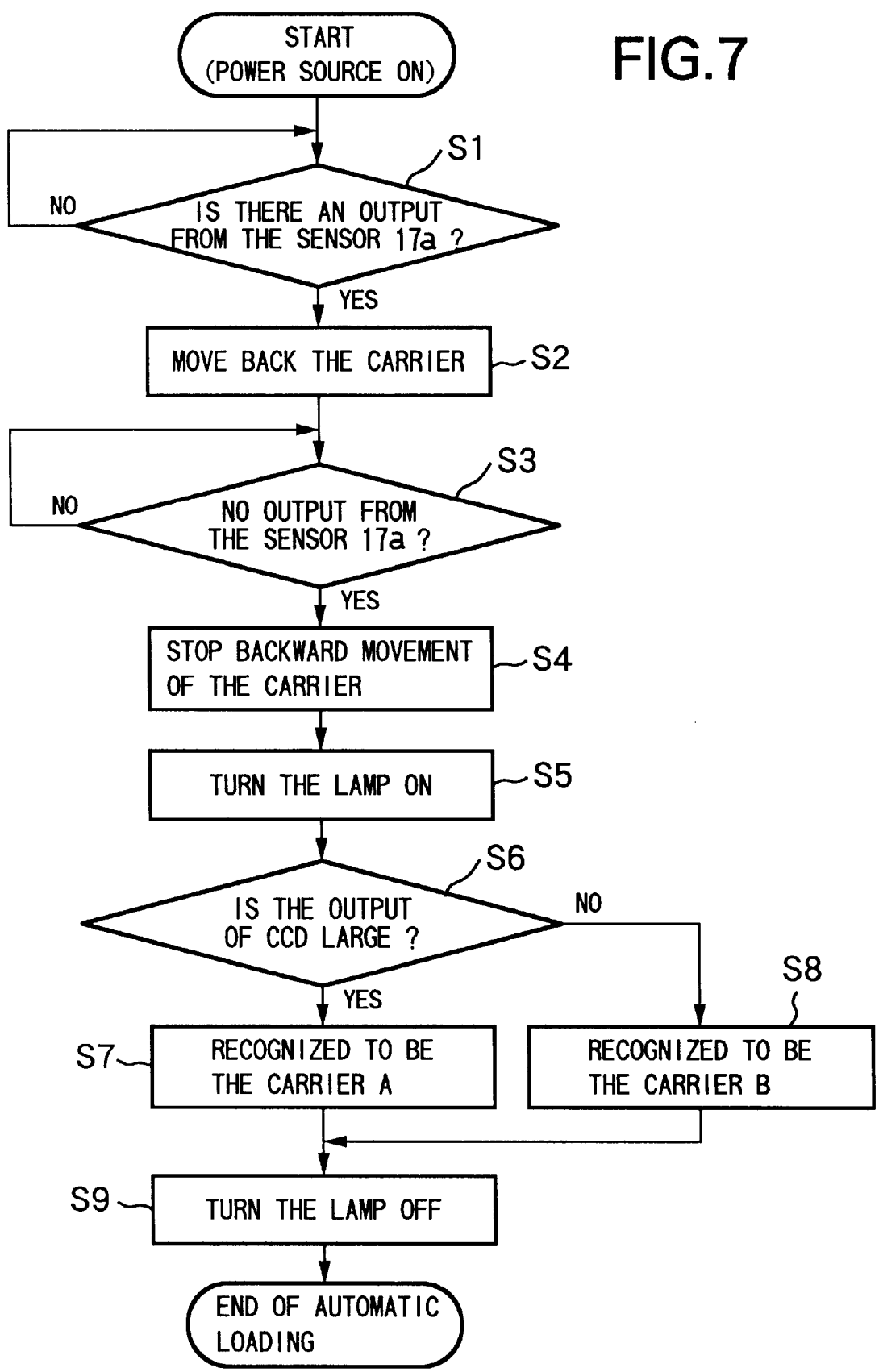
FIG. 7 is a flow chart illustrating a state of automatic loading and of discriminating the carrier.

First, the CPU 21 monitors the output of the sensor 17a (S1 in FIG. 7). The sensor 17a detects whether the carrier is loaded in the film scanner 10 or not, and generates an output at a moment when the carrier is inserted in the film scanner 10 through the opening 11.

The sensor 17a further generates an output at a moment when the carrier is loaded into the film scanner 10, and is disposed at such a position as will no longer produce the output when the carrier is moved back and its end arrives at the predetermined position.

Here, the predetermined position of the carrier A is the one where the light from the lamp 13 passes through the window A1 for white balance of the carrier A, and is reflected by the mirror 14 to arrive at the CCD 16.

When the carrier A is loaded and the sensor 17a generates output, the CPU 21 drives the motor 26 to move back the carrier A via the drive gear 12 (S2 in FIG. 7).

At a moment when the sensor 17a discontinues the generation of output, it means that the carrier A is disposed at the predetermined position. Therefore, the rotation of the motor 26 is stopped and the carrier A is stopped from moving back (S4 in FIG. 7).

At this moment, the CPU 21 turns the lamp 13 on (S5 in FIG. 7). The output of the CCD 16 as a result of receiving light at this moment is monitored by detecting the output of the image processing unit 23 (S6 in FIG. 7). When the output as a result of receiving light is larger than a given value, it means that the CCD 16 is receiving light from the lamp 13 through the window A1 for white balance. It is then recognized that the carrier that is loaded is the carrier A (S7 in FIG. 7).

When the output as a result of receiving light is smaller than the given value, it means that the CCD 16 is not receiving light from the lamp 13 since there is no window A1 for white balance. Therefore, the loaded carrier is recognized to be the carrier B (S8 in FIG. 7).

Figure 8A:
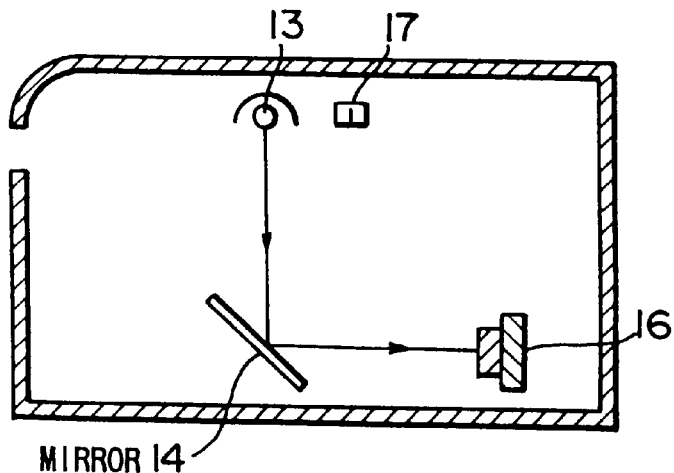
FIG. 8A through FIG. 8C are diagrams illustrating a state of discriminating a carrier A.
Figure 8B:
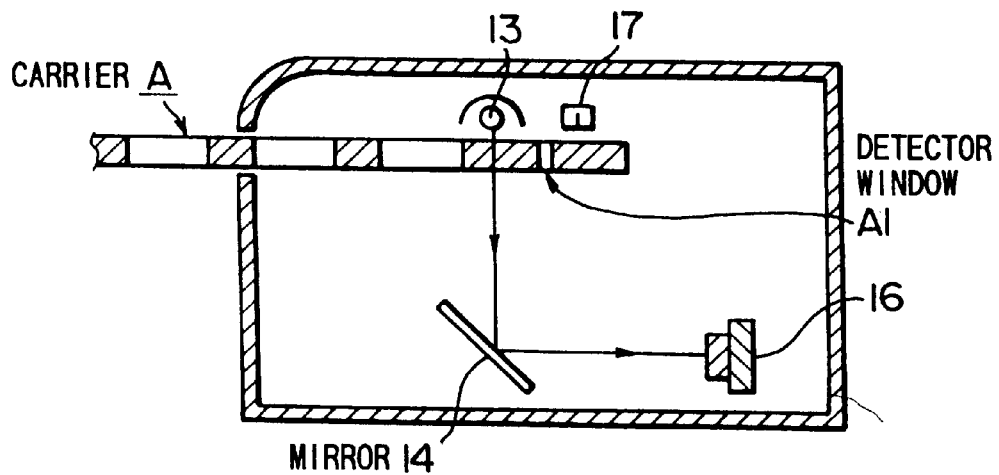
Figure 8C:
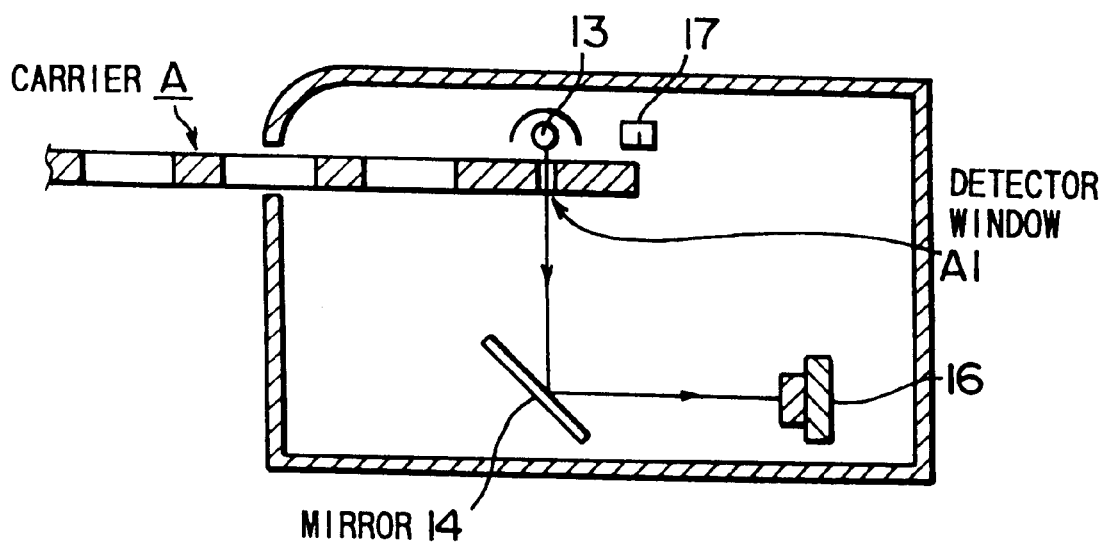

FIG. 8A is a sectional view illustrating a state of the film scanner 10 of before the carrier is being loaded, FIG. 8N B is a sectional view illustrating a state (S1 of FIG. 7) of when the carrier A is loaded in the film scanner 10, and FIG. 8(c) is a sectional view illustrating a state where the carrier is moved back to a predetermined position and the lamp 13 is turned on.

Figure 9:
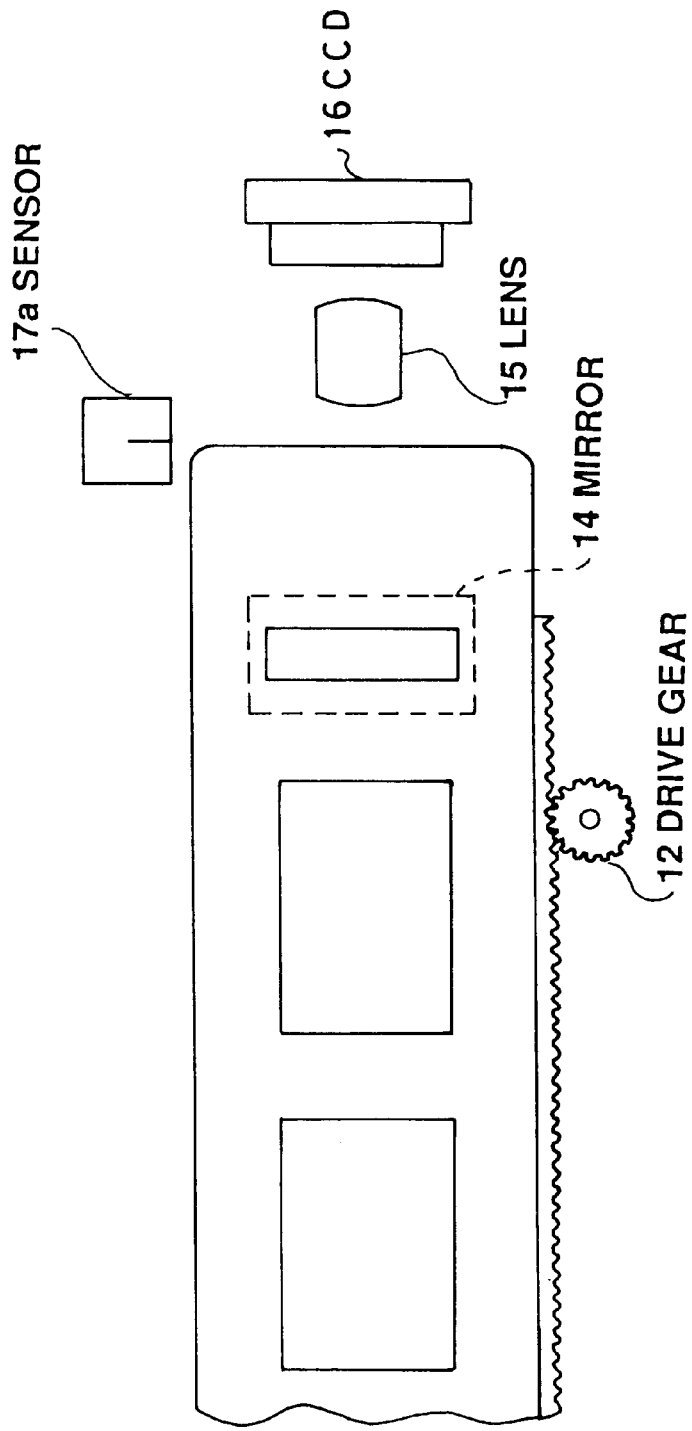
FIG. 9 is a diagram illustrating a state of automatic loading and of discriminating the carrier.

FIG. 9 is a top view illustrating a state where the same carrier A as that of FIG. 8C is at the predetermined position. FIG. 8 does not illustrate the stage 19 which is in the fixed state.

Figure 10A:
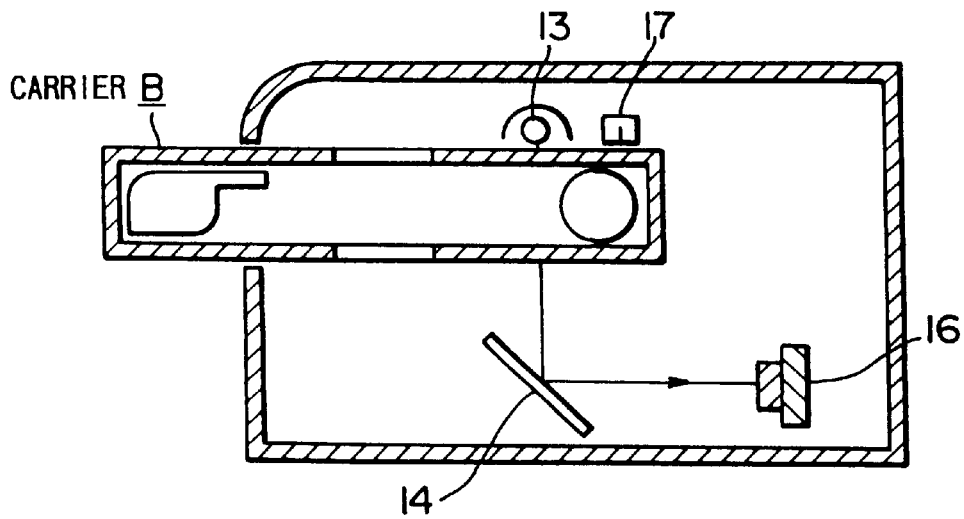
FIG. 10A and FIG. 10B are diagrams illustrating a state of discriminating the carrier B.
Figure 10B:
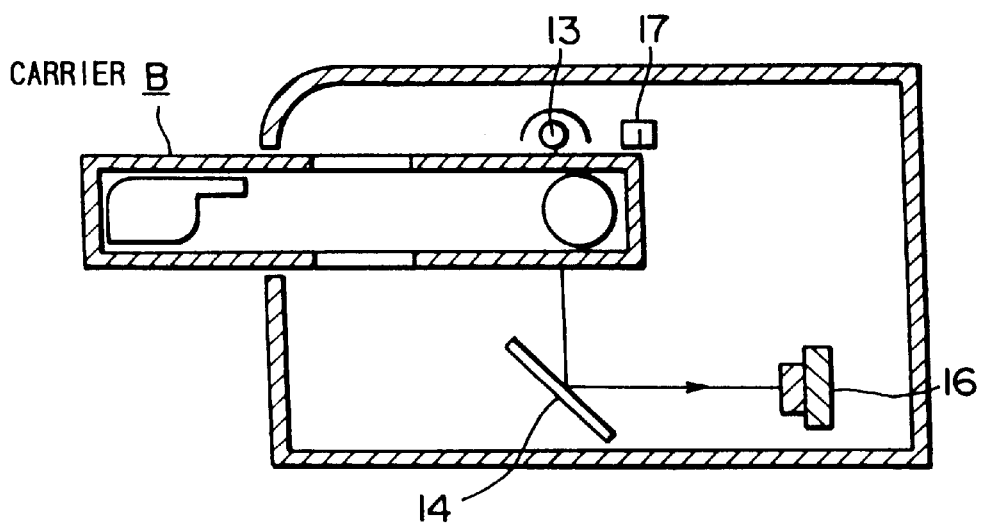

FIGS. 10A and 10B are sectional views illustrating a state where the carrier B without having a window for white balance is loaded in the film scanner 10, wherein FIG. 10A is a sectional view illustrating a state (S1 of FIG. 7) of when the carrier B is inserted in the film scanner 10.

FIG. 10B is a sectional view illustrating a state where the carrier B is moved back to a predetermined position and the lamp 13 is turned on. In this case, the CCD does not produce output since the carrier B has no window for white balance. Therefore, the CPU 21 recognizes the carrier B.

In order to more reliably discriminate that it is the carrier B when the CCD does not produce output, communication may be made between the CPU 21 and the CPU 51 via contacts shown in FIG. 6.

That is, a predetermined command is output from the CPU 21, and the CPU 51 that has received the command sends back a corresponding command. Therefore, the CPU 21 decodes the command sent back from the CPU 51 to reliably discriminate that it is the carrier B that is holding the long wound film IX-240.

As described above, the CPU 21 turns off the lamp 13 (S9 of FIG. 7) at a moment when the discrimination of the carrier is finished.

Figure 11:
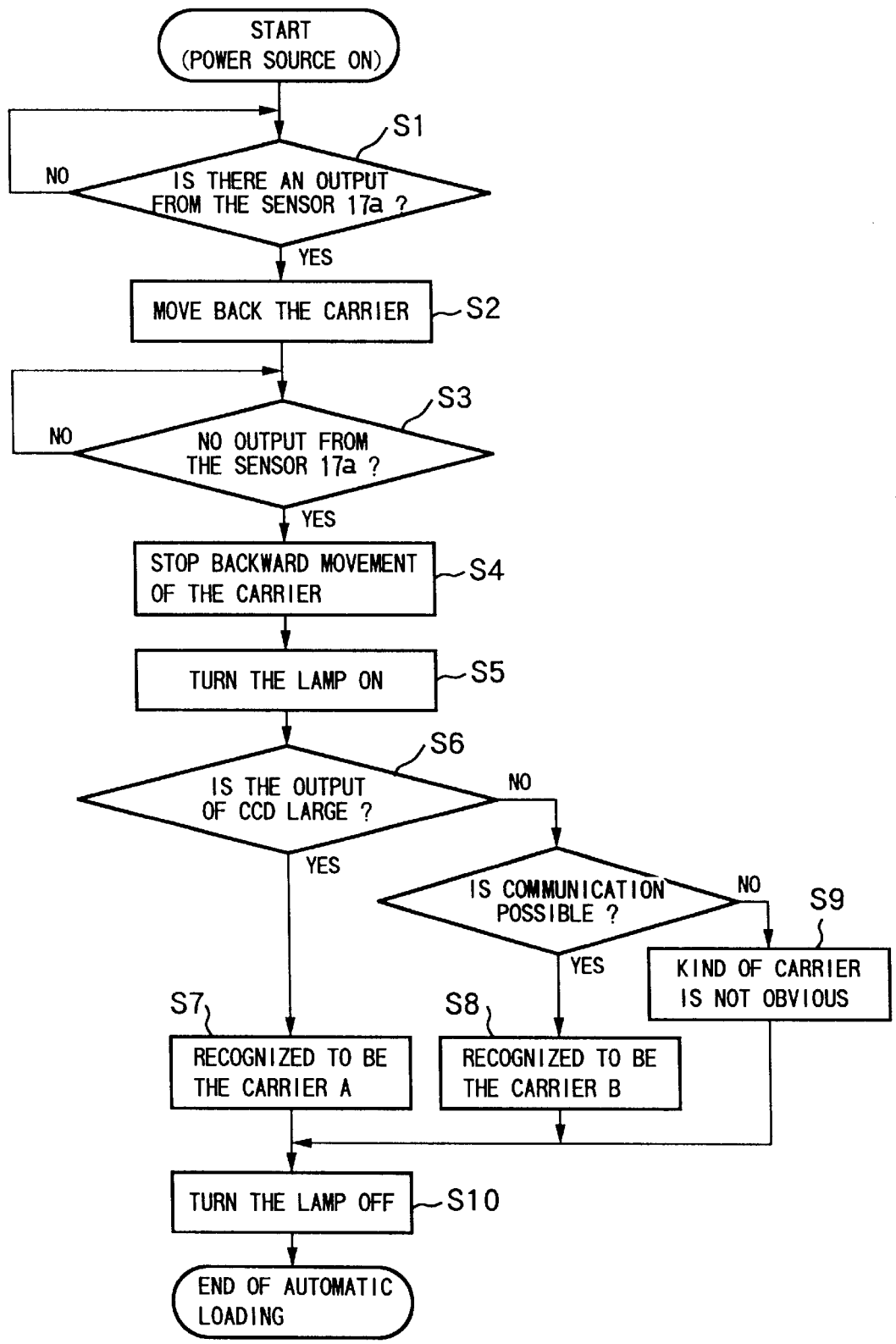
FIG. 11 is a flow chart illustrating a state of automatic loading and of discriminating the carrier.

When the CCD does not produce output and, hence, the carrier B is discriminated depending upon the result of communication, the carrier B is recognized when the communication is possible (S8 of FIG. 11). When the communication is not possible, the result of discriminating the carrier may be regarded to be an error (or the kind of carrier is not obvious)(S9 of FIG. 11).

Thus, the carrier is previously provided with a window for optical white balance at a predetermined position, the lamp 13 is turned on to read image data at a moment when the carrier is driven to a predetermined position, the light that has passed through the window for white balance is read by the CCD 16 for reading image data, and the CPU 21 recognizes the kind of the carrier (film held in the carrier or kind of cartridge) relying upon the result of reading (discrimination means).

Thus, it is possible to meet various films and cartridges, and the kind of the film or the cartridge is recognized on the side of the film scanner at a moment when the carrier is loaded in the film scanner. This is done by using the lamp 13 and the CCD 16 for reading image data but without requiring any particular constitution.

In the foregoing was described the case where the CPU 21 has recognized the kind of the film held in the carrier or the kind of the cartridge relying upon the presence of light (intensity of light) that has passed through the window (detector hole) for white balance. This is preferable from the standpoint of reliably recognizing the two kinds of carriers based on a simple processing. It is further allowable to provide the window for white balance with a color or a particular pattern to execute the recognition relying upon the image processing unit 23 and the CPU 21, making it possible to discriminate an increased number of kinds.

Prescanning Relying on a Different Drive Source

When the prescanning is instructed from an external computer or from the operation unit 22 of the film scanner 10 (S2 of FIG. 1) after the kind of the carrier has been discriminated as described above, the carrier or the stage is driven by a different drive means depending upon the kind of the carrier (S3 of FIG. 1), and the prescanning is effected (control means).

The prescanning is to coarsely read the contents of image data recorded in the film and to read a plurality of frames at one time. Therefore, minute reading needs not be effected unlike that of the main scanning that will be described later, and it is preferable that the reading is accomplished within short periods of time.

To effect the prescanning, therefore, the CPU 21 controls each of the portions so as to efficiently execute the scanning based upon the result of carrier discrimination.

When the carrier A is loaded in the film scanner 10, the stage 19 is maintained in the fixed state, and the carrier A itself is driven by the stepping motor 26 which is the first drive source (S4 of FIG. 1).

Figure 12A:
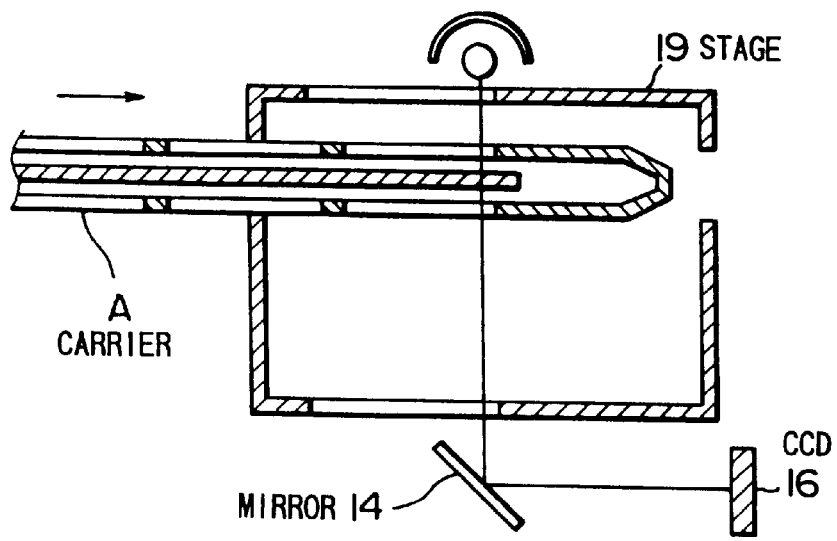
FIG. 12A through FIG. 12C are diagrams illustrating a state of prescanning the carrier A.
Figure 12B:
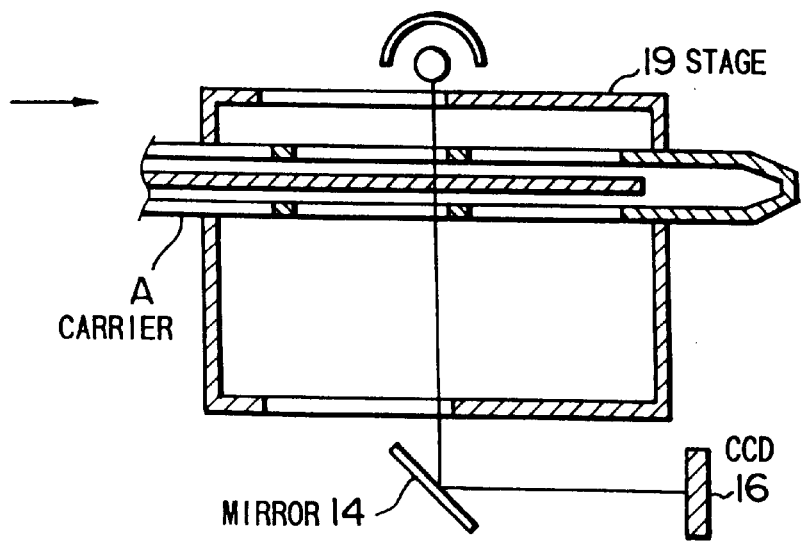
Figure 12C:
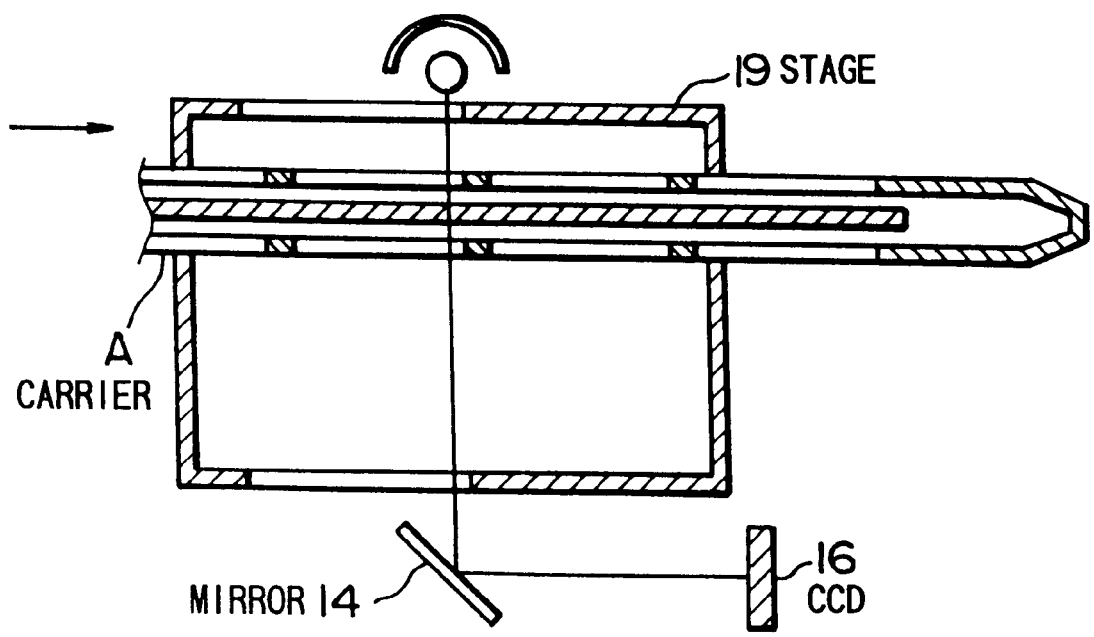

This state is shown in FIGS. 12A, 12B and 12C. As shown, the carrier A is prescanned efficiently and quickly provided the stage is fixed and the carrier A is driven by the stepping motor 26.

During the main scanning, the frames of the film held by the carrier A are successively conveyed to the reading position by the stepping motor 26. During the practical reading, the carrier A and the stage 19 are conveyed together at a low speed by the stepping motor 27 to read the film maintaining high precision.

In the prescanning, however, the image needs be coarsely read. Therefore, the image is read while conveying the carrier A at a relatively high speed by the stepping motor 26; i.e., the carrier A is prescanned efficiently and quickly.

The carrier A is conveyed by the stepping motor 26 by a distance necessary for conveying the frames (e.g., six frames) of the film held by the carrier A to the reading position. The carrier B is conveyed by the stepping motor 26 by a distance necessary for conveying the carrier B to the predetermined position (where the contacts are rendered to be conductive) of the stage 19. Furthermore, the stage 19 is conveyed by the stepping motor 27 by a distance which corresponds to the scanning distance of one frame. In the case of the carrier A, the film fed frame by frame by the stepping motor 26, is then fed by one frame at a low speed by the stepping motor 27 to effect the main scanning. In the case of the carrier B, the film fed frame by frame by the DC motor 55M is then driven by one frame at a low speed by the stepping motor 27 to effect the main scanning.

When the carrier B is loaded in the film scanner 10, on the other hand, the carrier B is driven together with the stage 19 by the stepping motor 27 which is the second drive means (S5 of FIG. 1). The carrier B must be held in a state of being electrically conducted to the contacts provided on the side of the stage 19, and an instruction for feeding frame by frame and the electric power must be fed from the film scanner 10. Therefore, the carrier B must be fixed to the stage 19. Even in the prescanning or main scanning, therefore, the stage 19 must be driven by the stepping motor 27 to convey the film.

Figure 13A:
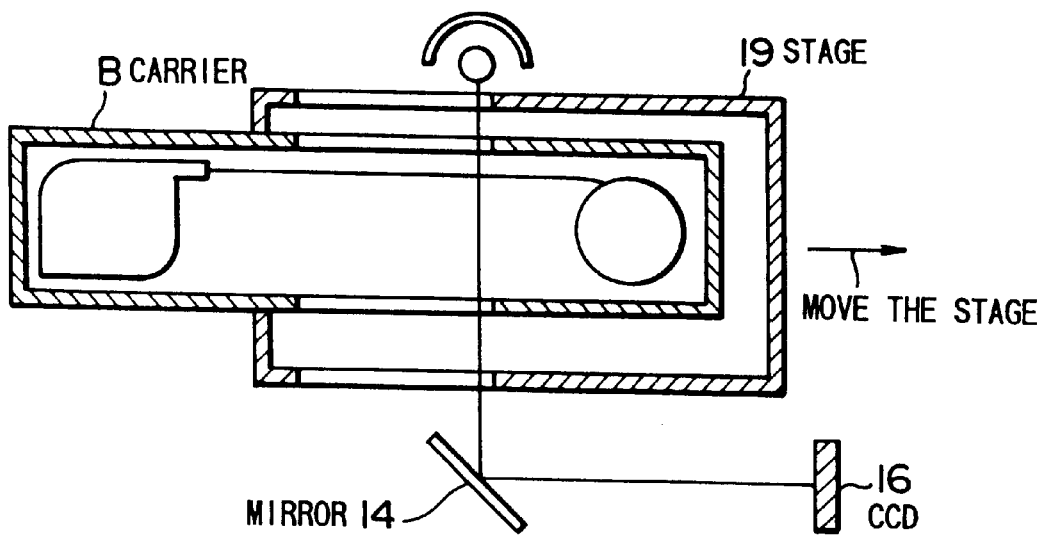
FIG. 13A and FIG. 13B are diagrams illustrating a state of prescanning the carrier B and of scanning the carrier B.
Figure 13B:
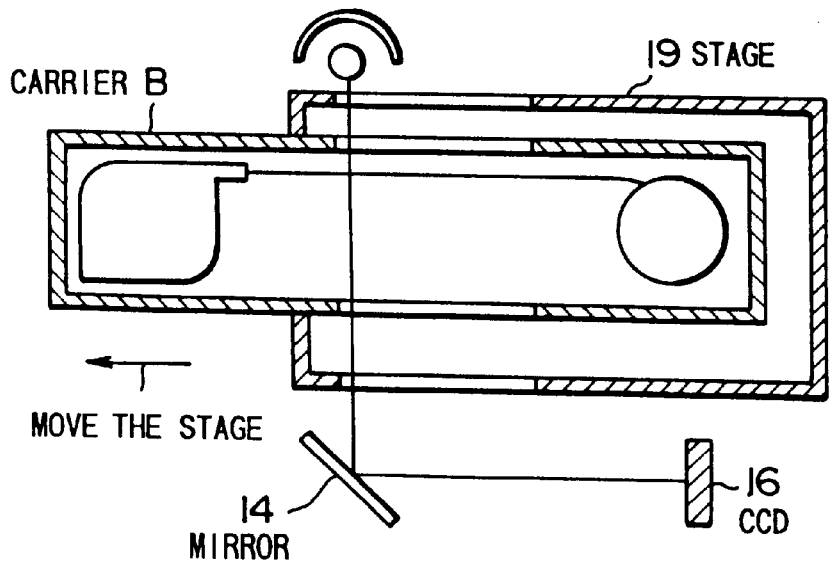

This state is shown in FIGS. 13(a) and 13(b). In this case, all frames of the long wound film IX-240 are read by alternatingly executing the operation for winding the long wound film X-240 by one frame by the DC motor 55M from the cartridge that is held by the carrier B and the operation for reciprocally moving the stage 19 by one frame by the stepping motor 27.

When the rotational speed of the stepping motor 27 can be variably controlled depending upon the required resolution, it is preferable, during the prescanning of the carrier B, that the rotational speed of the stepping motor 27 is so controlled as to become nearly equal to the speed for conveying the film by the stepping motor 26.

Main Scanning by the Same Drive Means

When the main scanning is instructed from the external computer or from the operation unit 22 of the film scanner (S6 of FIG. 1 ) after the carrier has been discriminated and the prescanning has been completed depending upon the result of discrimination, the stage 19 is driven by the stepping motor 27 to effect the main scanning though the different method of frame-feeding may be employed depending upon the discrimination of the carrier A or B (S7 of FIG. 1).

The main scanning is to minutely read the contents of the image data recorded in the film and from the required frames only. Even in reading the film held by the carrier A, therefore, it becomes necessary to read the film by driving the stage 19 at a low speed by the stepping motor 27. According to this embodiment, the image data are read with 144 dpi during the prescanning and with 200 dpi to 1200 dpi during the main scanning.

During the main scanning operation, therefore, the CPU 21 controls each of the portions so as to execute the scanning maintaining good precision based upon the result of carrier discrimination.

When the carrier A is loaded in the film scanner 10, the required frames only are fed by the stepping motor 26 which is the first drive means, and the main scanning is effected by driving the stage 19 and the carrier A together by the stepping motor 27 which is the second drive means (S8 of FIG. 1).

Figure 14A:
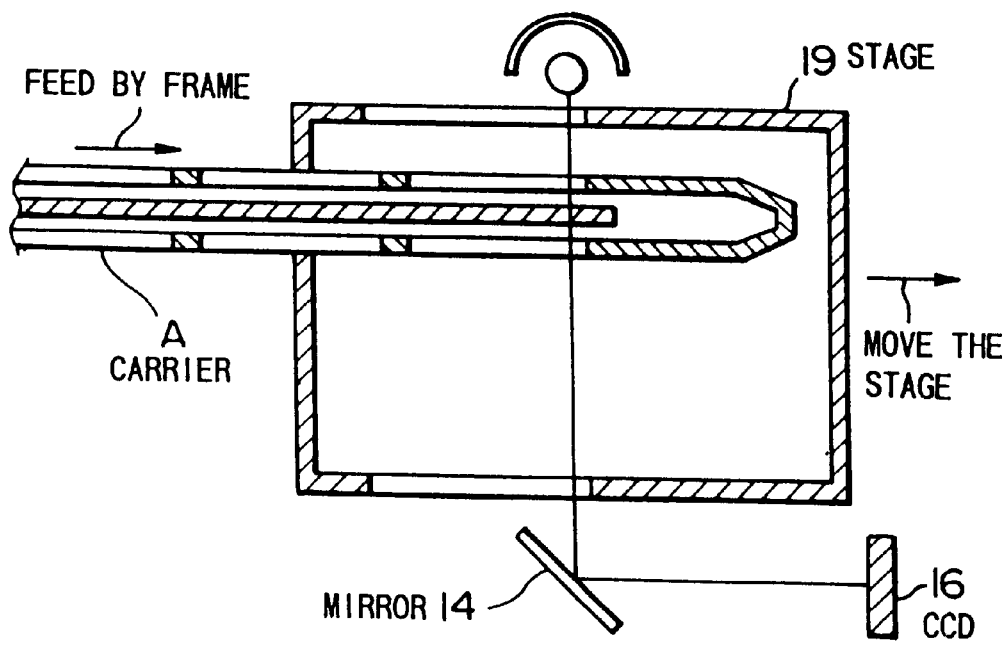
FIG. 14A and FIG. 14B are diagrams illustrating a state of scanning the carrier A.
Figure 14B:
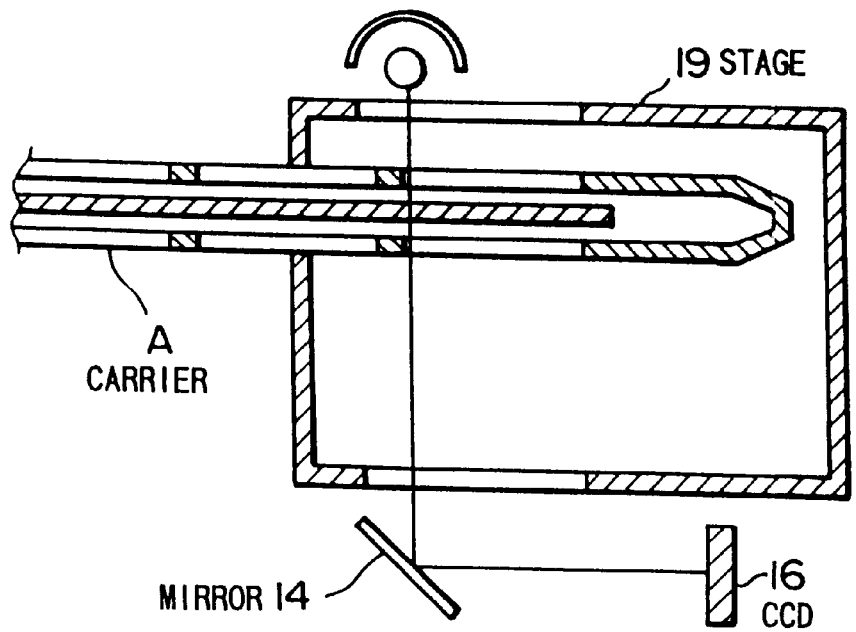

This state is shown in FIGS. 14A and 14B. In the case of the carrier A as described above, the prescanning is effected by directly driving the carrier A by the stepping motor 26 which is the first drive means. During the main scanning operation, however, the stage 19 and the carrier A together are driven at a low speed by the stepping motor 27 which is the second drive means, so that the image is read maintaining a high resolution.

When the carrier B is loaded in the film scanner 10, on the other hand, the main scanning is effected by driving the stage 19 and the carrier A together by the stepping motor 27 which is the second drive means like during the prescanning operation (S9 of FIG. 1).

This state is as shown in the above-mentioned FIGS. 13A and 13B. Usually, the stage 19 is moved (scanned) during the main scanning operation at a speed lower than that of during the prescanning operation. However, the state of frame-feeding and scanning are the same as those of during the prescanning operation. The stage 19 is reciprocally moved after the feeding by a frame, so that all frames of the long wound film IX-240 can be read maintaining a high resolution.

Thus, loading, prescanning and main scanning are completed to end the whole sequence.

Other Embodiments

Figure 15:
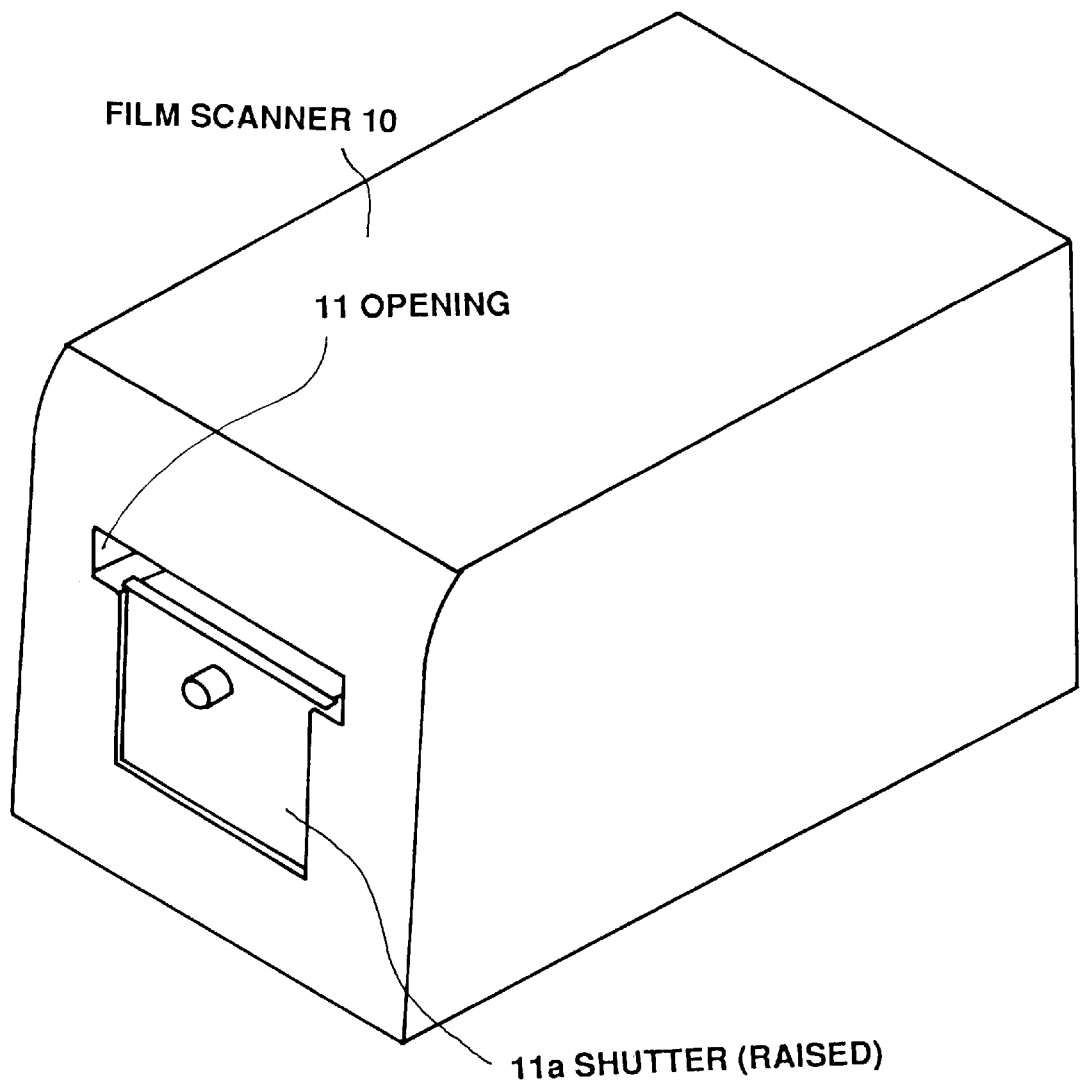
FIG. 15 is a perspective view illustrating an opening (shutter is being raised) of the film scanner.

FIG. 15 is a perspective view of when the whole film scanner 10 is viewed from the front upper right direction. The film scanner 10 has, in the front surface thereof, an opening 11 for inserting the carrier A and the carrier B.

The opening 11 is constituted by a window of a downwardly protruded shape so as to accept two kinds of carriers having different thicknesses. That is, the carrier A is inserted in the broad window of the upper side, and the carrier B is inserted in the whole window of the downwardly protruded shape.

Being constituted as described, the carriers containing different kinds of films and having different thicknesses can be inserted in the same opening, and the automatic loading and the prescanning can be executed by the same drive source (stepping motor 26).

When the carrier A is being inserted, foreign matter may enter through the window that is opened excessively. It is therefore preferable to provide a shutter 11a to prevent the infiltration of foreign matter.

For this purpose, grooves are formed in the side surfaces of the window on the lower side of the opening 11, and the shutter 11a is fitted to slide along the grooves. It is further desired to provide a stopper to stop the shutter 11a at its most raised position and at its most lowered position.

FIG. 15 illustrates a state where the shutter 11a is raised. When the carrier A is inserted in this state, no extra opening is formed, and foreign matter is prevented from entering into the film scanner 10.

Figure 16:
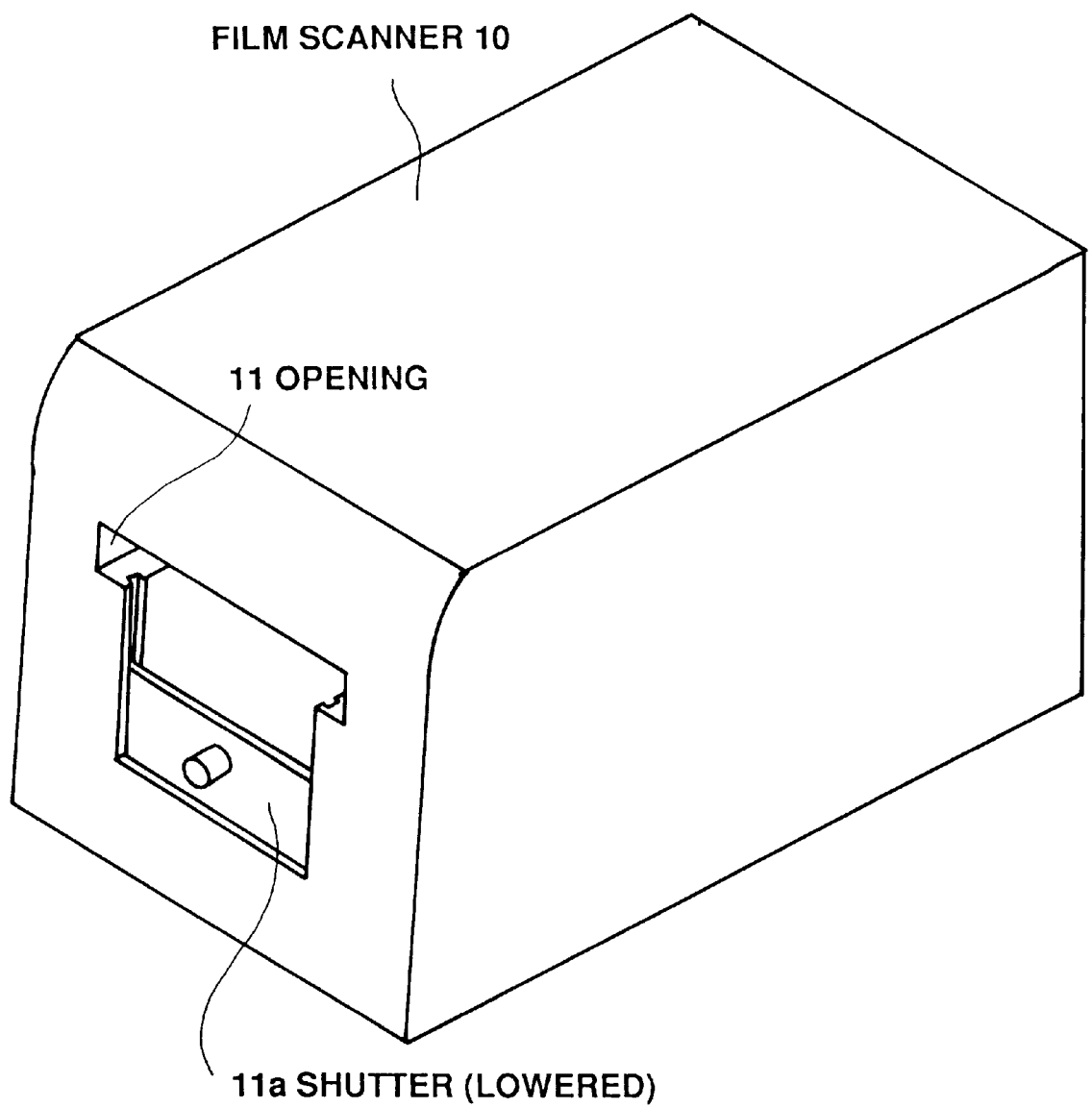
FIG. 16 is a perspective view illustrating the opening (shutter is being lowered) of the film scanner.

FIG. 16 illustrates a state where the shutter 11a is lowered. In this state, the opening is large enough for inserting the carrier B. Even in this case, no extra opening is formed, and foreign matter is prevented from entering into the film scanner 10.

The shutter 11a may be raised or lowered by the operator by using a protuberance provided on the front surface of the shutter 11a, or by using a drive source such as motor or the like by designating the carrier from the external computer or the like. Here, though the shutter 11a is of the type that is raised and lowered, it may be of the type which tilts into the film scanner 10 (tilts backwards).

We claim:

1. A film scanner for optically reading image data recorded on a film, comprising:

an image data reader means;

a discrimination means for discriminating a first carrier holding a film from a second carrier holding a cartridge that contains a film;

a first drive means for driving said first carrier or said second carrier;

a second drive means for driving said first carrier or said second carrier; and a control means which, when said first carrier is discriminated by said discrimination means, causes said first drive means to drive said first carrier so that said first carrier is prescanned and, when said second carrier is discriminated by said discrimination means, causes said second drive means to drive said second carrier so that said second carrier is prescanned.

2. A film scanner according to claim 1, wherein, when said first carrier is discriminated by said discrimination means, said control means causes said second drive means to drive said first carrier so that said first carrier is scanned maintaining a precision higher than that of said prescanning and, when said second carrier is discriminated by said discrimination means, said control means causes said second drive means to drive said second carrier so that said second carrier is scanned maintaining a precision higher than that of said prescanning.

3. A film scanner according to claim 1, wherein said discrimination means executes the discrimination based on the constitution of said first carrier and on the constitution of said second carrier.

4. A film scanner according to claim 1, wherein said discrimination means executes the discrimination by optically detecting the predetermined positions of said first carrier and of said second carrier.

5. A film scanner according to claim 1, wherein said discrimination means executes the discrimination by optically detecting predetermined positions of said first carrier and of said second carrier by using said image reader means.

6. A film scanner according to claim 1, wherein said discrimination means makes a detection for discrimination after said first or second carrier is moved to a predetermined position by said first drive means.

7. A film scanner according to claim 1, wherein said first carrier is for holding a piece film cut every after several frames, and said second carrier is for holding said cartridge that contains a long wound film.

8. A film scanner according to claim 1, further comprising an opening which changes into a plurality of stages to accept said first and second carriers.

9. A film scanner according to claim 1, wherein said second drive means drives said first or second carrier more accurately than said first drive means.

* * * * *